(12) United States Patent
Suzuki (10) Patent No.: US 11,436,421 B2
(45) Date of Patent: Sep. 6, 2022

(54) TAG READER AND TAG READING SYSTEM

(71) Applicant: TOSHIBA TEC KABUSHIKI KAISHA, Tokyo (JP)

(72) Inventor: Shigeaki Suzuki, Gotemba Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/122,746

(22) Filed: Dec. 15, 2020

(65) Prior Publication Data

US 2021/0264119 A1 Aug. 26, 2021

(30) Foreign Application Priority Data

Feb. 25, 2020 (JP) ............................. JP2020-029098

(51) Int. Cl.
*G06K 7/00* (2006.01)
*G06K 7/10* (2006.01)
*G06K 17/00* (2006.01)
*H01Q 1/22* (2006.01)

(52) U.S. Cl.
CPC ....... *G06K 7/0008* (2013.01); *G06K 7/10019* (2013.01); *G06K 17/0022* (2013.01); *H01Q 1/2208* (2013.01)

(58) Field of Classification Search
CPC .. G06F 3/0485; G06F 3/0482; G06F 3/04886; H04N 1/00411; H04N 1/00413; H04N 1/00469; H04N 1/00501; H04N 2201/0093; H04N 2201/0094; H04N 1/00458; H04N 1/32101; H04M 2250/22; H04M 1/2747

USPC ................. 340/10.1–10.5, 572.4, 7.21, 7.24; 455/226.1, 420
See application file for complete search history.

(56) References Cited

U.S. PATENT DOCUMENTS

| | | | | |
|---|---|---|---|---|
| 5,294,931 | A * | 3/1994 | Meier .................. | G06K 7/0008 342/44 |
| 5,778,309 | A * | 7/1998 | Tuttle ................... | H04W 52/50 340/10.34 |
| 6,104,512 | A * | 8/2000 | Batey, Jr. ........... | H04B 10/1143 340/7.54 |
| 6,486,769 | B1 * | 11/2002 | McLean ............... | G06K 7/0008 340/10.1 |
| 7,161,489 | B2 * | 1/2007 | Sullivan ............... | G06K 7/0008 705/28 |

(Continued)

FOREIGN PATENT DOCUMENTS

JP 2013088973 A 5/2013

OTHER PUBLICATIONS

Extended European Search Report dated Jul. 19, 2021, dated in counterpart European Application No. 21156220.2, 8 pages.

*Primary Examiner* — Nam V Nguyen
(74) *Attorney, Agent, or Firm* — Kim & Stewart LLP (57) ABSTRACT

A tag reader includes a communication controller, a communication interface, and a processor. The communication controller controls an output level of an output signal to be output from an antenna for reading an RFID tag. The communication interface communicates with a host device. The processor specifies a minimum output level of the output signal at which the RFID tag can be read and transmits the minimum output level to the host device through the communication interface.

20 Claims, 6 Drawing Sheets

(56) References Cited

U.S. PATENT DOCUMENTS

| | | | | |
|---|---|---|---|---|
| 8,274,372 | B2* | 9/2012 | Fujino | H04B 5/0062 |
| | | | | 340/10.4 |
| 8,339,266 | B2* | 12/2012 | Nikitin | G07G 1/009 |
| | | | | 340/572.1 |
| 9,082,026 | B2 | 7/2015 | Sano et al. | |
| 9,268,980 | B2* | 2/2016 | Tsuchida | G06K 7/10217 |
| 9,953,194 | B2* | 4/2018 | Nakano | G06K 7/0008 |
| 10,127,414 | B2* | 11/2018 | Zumsteg | G06K 7/10128 |
| 10,972,151 | B2* | 4/2021 | Smirnov | G06K 7/10316 |
| 2002/0070862 | A1 | 6/2002 | Francis et al. | |
| 2010/0141396 | A1 | 6/2010 | Fujino | |
| 2011/0316675 | A1* | 12/2011 | Tsujimoto | G06K 7/10089 |
| | | | | 340/10.4 |
| 2013/0154801 | A1* | 6/2013 | O'Haire | G06K 7/10009 |
| | | | | 340/10.1 |
| 2015/0035651 | A1 | 2/2015 | Tsuchida et al. | |
| 2020/0134270 | A1* | 4/2020 | Hueber | G06K 7/10128 |

* cited by examiner

TAG READER AND TAG READING SYSTEM

CROSS-REFERENCE TO RELATED APPLICATIONS

This application is based upon and claims the benefit of priority from Japanese Patent Application No. 2020-029098, filed on Feb. 25, 2020, the entire contents of which are incorporated herein by reference.

FIELD

Embodiments described herein relate generally to a tag reader and a tag reading system.

BACKGROUND

Some tag readers can vary the strength (power level) of an output signal used for reading a Radio-Frequency Identification (RFID) tag (also referred to as a wireless tag). A tag reader and a host device may constitute a tag reading system, in which the tag reader operates in accordance with a command from the host device. For example, a tag reader sets the output value for the output signal used for reading RFID tags in accordance with a setting value specified by a command from a host device.

In such a tag reading system, in order for the tag reader to perform the reading process of an RFID tag by changing the output value, the host device must supply a command to the tag reader particularly including the setting value to be used every time the output value is to be changed. For this reason, the minimum output value at which the tag reader can read a specific RFID tag has to be determined from a series of reading results obtained with the host device gradually changing the output value by commands over time. This operation requires some time for the tag reader to identify the minimum output value at which the specific RFID tag can be read.

DETAILED DESCRIPTION

According to one or more embodiments, a tag reader includes a communication controller, a communication interface, and a processor. The communication controller controls an output level of an output signal to be output from an antenna for reading an RFID tag. The communication interface communicates with a host device. The processor specifies a minimum output level of the output signal at which the RFID tag can be read and transmits the minimum output level to the host device through the communication interface.

Hereinafter, certain example embodiments will be described with reference to the accompanying drawings.

Figure 1:
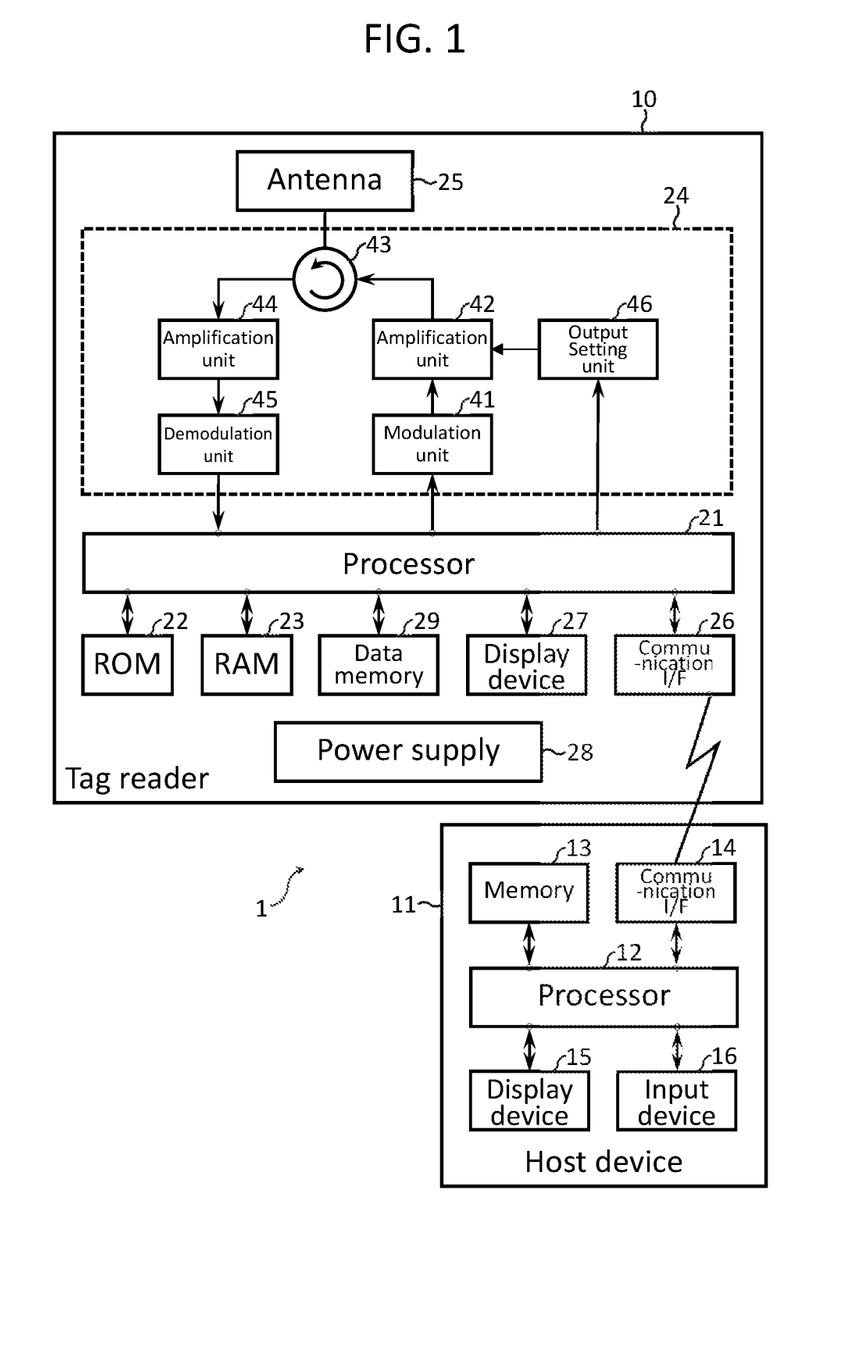
FIG. 1 is a block diagram of a tag reading system according to an embodiment.

FIG. 1 is a block diagram illustrating an example configuration of a tag reading system 1 according to an embodiment. The tag reading system 1 according to the present embodiment includes a tag reader 10 and a host device 11. The tag reader 10 reads an RFID tag (or a wireless tag). The host device 11 estimates a position of the RFID tag based on a continuous repetitive reading of the RFID tag by the tag reader 10 and identifies an article, an item, or the like to which the read RFID tag is attached.

For example, the tag reading system 1 is operated as a search system for searching for an article to which an RFID tag has been attached. Such a search system may cover a predetermined area such as a warehouse or a retail store. In the tag reading system 1 operated as such a search system, the tag reader 10 continuously attempts to read the RFID tag while the tag reader 10 moves in the predetermined area. The host device 11 detects a position or the like of the RFID tag based on the reading result of the RFID tag as acquired from the tag reader 10. Along with tag information read from the RFID tag, the tag reader 10 of the present embodiment supplies, to the host device 11, a minimum output value (or a minimum signal strength) for an output signal (interrogation wave or the like) at which the RFID tag has been read.

In the present embodiment, the tag reader 10 repeatedly reads the RFID tag attached to an article such as a commodity while the tag reader 10 moves around. The host device 11 executes predetermined processing (for example, search processing) based on the reading results from the RFID tag. In another embodiment, in a tag reading system 1, the tag reader 10 can be installed at a fixed position may be utilized to repeatedly read an RFID tag attached to a moving article.

The tag reader 10 reads information recorded in an RFID tag. The information from the RFID tag is received in a response signal from an RFID tag within a communication range (that is a reading range) of the tag reader 10. For example, the tag reader may be a hand-held type device that is held by an operator or may be mounted on a moving body.

The tag reader 10 transmits an interrogation signal (an output signal) for requesting a response from the RFID tag at a preset intensity (or a preset output value). The tag reader 10 receives a response signal from RFID tags receiving the interrogation signal. The tag reader 10 receives a response signal indicating tag information from the RFID tag that is present in a communication range and has been activated by the transmitted output signal. When a plurality of RFID tags are in the communication range, the tag reader 10 receives response signals indicating tag information from each of the respective RFID tags.

The tag reader 10 notifies the host device 11 of a minimum output value of an output signal at which each RFID tag can be read (that is, the lowest output value for the interrogation signal for which a response signal from the RFID tag was received). The tag reader 10 transmits a reading result including the tag information of the RFID tag and the minimum output value to the host device 11. The tag reader 10 may measure a Received Signal Strength Indicator (RSSI) value indicating the strength of a response signal received from the RFID tag. In this case, the tag reader 10 may include the RSSI value for each reading of the RFID tag to the host device 11 in the reading result of the RFID tag.

The RFID tag is typically attached to an article such as a commodity or a component, and tag information including information that can be used for identifying the article is recorded in an internal memory of the RFID tag. The RFID tag is activated by the radio wave transmitted from the tag reader 10. Upon receiving the interrogation signal, RFID tag outputs a response signal including its recorded tag information in response to a read command (interrogation signal) received from the tag reader 10. The RFID tag can be powered by the radio waves output from the tag reader 10.

The host device 11 is an information processing terminal communicably connected to the tag reader 10. For example, the host device 11 is an information processing terminal such as a smartphone or a tablet PC including a display device with a touch panel as a user interface. The host device 11 may instead be an information processing device installed at a specific position as long as it has a communication interface capable of communicating with the tag reader.

In the present embodiment, the host device 11 includes a processor 12, a memory 13, a communication interface (I/F) 14, a display device 15, an input device 16, and the like. The processor 12 performs control of each unit, data processing, and the like. The processor 12 is, for example, a CPU. The processor 12 executes a program stored in the memory 13 to perform various operations. For example, the processor 12 detects the position of the RFID tag or a change in the relative position between the tag reader 10 and the RFID tag based on the reading result of the RFID tag acquired from the tag reader 10. These processes are realized by the processor 12 executing a program (or programs), such as an application program, installed in the memory 13.

The communication interface (I/F) 14 is an interface for communicating with an external device. In the present embodiment, the communication I/F 14 is an interface for communicating with the tag reader 10. The communication I/F 14 may correspond to the communication function of the tag reader 10. The communication I/F 14 may be an interface for wired communication or an interface for wireless communication. For example, the communication I/F 14 is realized by a LAN interface, a universal serial bus (USE) interface, a Bluetooth (registered trademark) interface, a Wi-Fi interface, or the like.

The display device 15 is a device that displays information. For example, the display device 15 displays a detection result of the RFID tag (for example, movement of the RFID tag). The input device 16 is a device for an operator to input an operation instruction or the like. The display device 15 and the input device 16 are configured by, for example, a display device with a touch panel.

In the present embodiment, the tag reader 10 includes a processor 21, a ROM 22, and a RAM 23, a communication controller such as a communication control circuit 24, an antenna 25, a communication interface (I/F) 26, a display device 27, a power supply 28, and a data memory 29.

The processor 21 controls each unit. The processor 21 includes, for example, an arithmetic circuit such as a CPU. The processor 21 implements control of each unit and various types of data processing by executing a program (or programs). The processor 21 may include an internal memory. The processor 21 implements various processes by executing a program stored in the ROM 22 or the internal memory. For example, the processor 21 interprets a command from the host device 11 received by the communication I/F 26 and executes a process corresponding to the command.

The ROM 22 is a non-volatile and non-rewritable memory. The ROM 22 stores a program (or programs) to be executed by the processor 21 and the like. The RAM 23 is a volatile memory that temporarily stores data. For example, the RAM 23 functions as a working memory or a buffer memory. The RAM 23 has a buffer memory for storing the reading result of the RFID tag.

The communication controller or the communication control circuit 24 and the antenna 25 constitute an RFID interface for reading an RFID tag. The communication control circuit 24 includes a control circuit for communicating with the RFID tag via the antenna 25. The communication control circuit 24 causes the antenna 25 to transmit a transmission signal (or a radio wave) supplied from the processor 21 at a preset output value. The antenna 25 outputs the transmission signal supplied from the communication control circuit 24 as a radio wave that can be received by the RFID tag.

The communication control circuit 24 not only outputs a transmission signal to the antenna 25 but also supplies a signal received by the antenna 25 to the processor 21 as reception data. For example, the antenna 25 receives a response signal from the RFID tag, and the response signal (reception signal) received by the antenna 25 is processed and supplied to the processor 21. For example, the communication control circuit 24 supplies to the processor 21 tag information included in a reception signal from the RFID tag and an RSSI value indicating the intensity of the reception signal.

The communication I/F 26 is an interface for communicating with an external device. In the present embodiment, the communication I/F 26 is a communication interface for communicating with the host device 11. The communication I/F 26 may be an interface for wired communication or an interface for wireless communication. For example, the communication I/F 26 is realized by a LAN interface, a universal serial bus (USE) interface, a Bluetooth (registered trademark) interface, a Wi-Fi interface, or the like.

The display device 27 is a display device that displays an operation state of the RFID tag. The display device 27 comprises, for example, an LED or the like. The power supply 28 supplies power for operating the tag reader 10. The power supply 28 supplies power for operation to each unit of the tag reader 10. For example, if the tag reader is a handy type, the power supply 28 may comprise a rechargeable battery. If the tag reader is a stationary type connectable to a commercial power supply, the power supply 28 may comprise a power supply circuit connected to the commercial power supply.

The data memory 29 is a rewritable nonvolatile memory. The data memory 29 stores setting values and other information used for various processes. The setting values stored in the data memory 29 are, for example, information that can be updated according to an operation mode or the like. The data memory 29 may store an application program and the like. The data memory 29 may store information such as a processing result to be held even after the power is turned off.

The tag reader 10 may include a timer that measures time. For example, the timer measures an elapsed time from when a read operation is stopped (for example, when output of the output signal is halted) to when the next read operation is started (for example, when another output signal is output). The processor 21 may use the timer and detect that a pause time or a downtime from when the read operation is stopped to when the next read operation is started has reached a preset read interval.

In the configuration example illustrated in FIG. 1, the communication control circuit 24 includes a modulation unit 41, a transmission-side amplification unit 42, a direction coupler 43, a reception-side amplification unit 44, a demodulation unit 45, an output setting unit 46, and the like.

In general, some or all of the various units of the communication control circuit 24 may be implemented as circuits, circuitry, or otherwise.

In the present example, the modulation unit 41 is a modulation circuit that modulates a waveform signal with input data. The modulator 41 modulates a carrier wave with the transmission data supplied from the processor 21. The transmission-side amplification unit 42 includes an amplification circuit that amplifies the input signal. The transmission-side amplification unit 42 amplifies the output signal from the modulator 41. The direction coupler 43 includes a circuit that supplies the output signal from the transmission-side amplification unit 42 to the antenna 25. Thus, the communication control circuit 24 outputs a carrier wave that has been modulated with the transmission data from the antenna 25.

The RFID tag receives the radio wave transmitted from the antenna 25. The RFID tag recognizes, for example, a read command included in the signal received from the antenna 25. When the RFID tag recognizes the read command, the RFID tag outputs data, including tag information, stored in the memory of the RFID tag via a return radio wave generated, for example, by backscatter modulation.

The antenna 25 receives the radio wave (response signal) output from the RFID tag. The direction coupler 43 includes a circuit that acquires the signal received by the antenna 25 and supplies the acquired response signal to the reception-side amplification unit 44. In this example, the reception-side amplification unit 44 includes an amplification circuit that amplifies an input signal. The reception-side amplification unit 44 amplifies the response signal received by the antenna 25. The demodulation unit 45 includes a demodulation circuit that demodulates the data superimposed on the waveform signal (or the carrier wave). The demodulation unit 45 demodulates data, such as tag information, included in the response signal amplified by the reception-side amplification unit 44.

The antenna 25 may transmit and receive the radio wave to and from the RFID tag. The antenna 25 may transmit a signal to be supplied to the RFID tag and receive a radio wave output from the RFID tag. In the present embodiment, the antenna 25 is arranged to transmit electromagnetic waves toward a reading area. The tag reader 10 is configured to communicate with a plurality of RFID tags attached to a plurality of commodities arranged in the reading area via the antenna 25. The antenna 25 is, for example, a planar antenna. The antenna 25 is not limited to any specific configuration.

The output setting unit 46 includes a setting circuit that sets the strength (power level) of a signal to be output from the tag reader 10. The output setting unit 46 performs control so that the strength of the signal output from the transmission-side amplification unit 42 matches a preset output value. The transmission-side amplification unit 42 amplifies the signal supplied from the modulation unit 41 so as to have an output value set by the output setting unit 46 and outputs the amplified signal to the direction coupler 43. Thus, the antenna 25 transmits an output signal having an output value as set by the output setting unit 46 and supplied from the amplifying unit 42 via the coupler 43.

Figure 2:
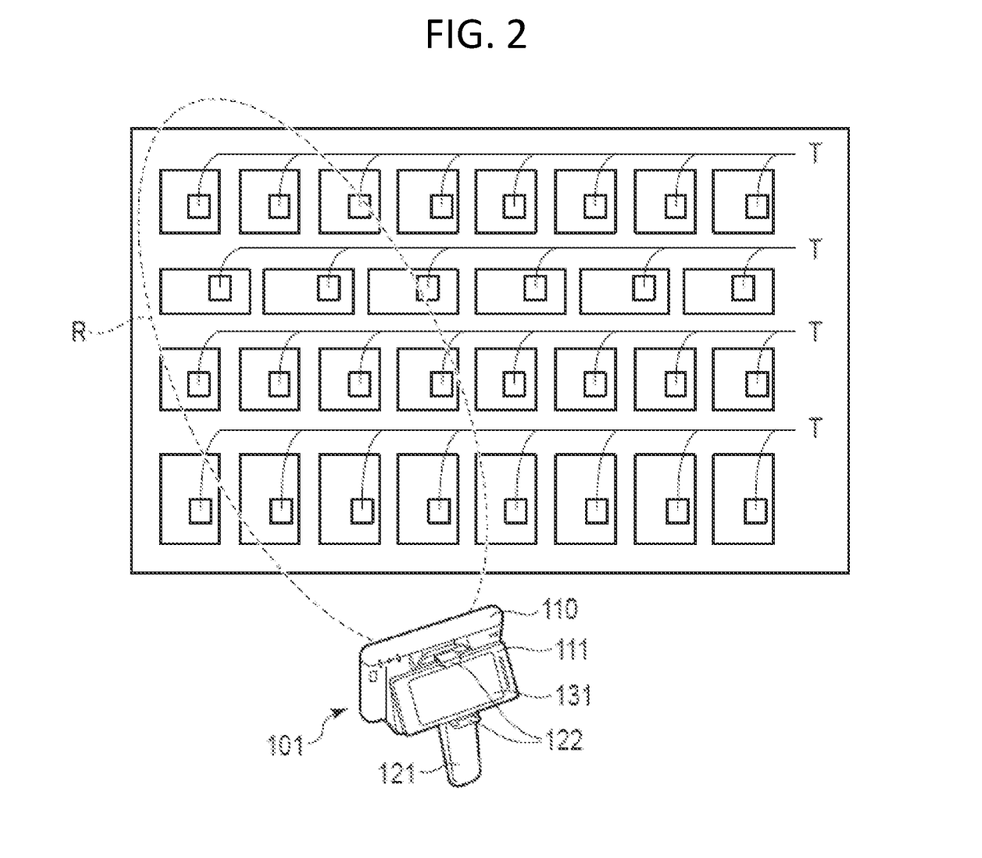
FIG. 2 depicts a tag reading system according to an embodiment.

FIG. 2 depicts an example configuration of a tag reading system 1 operating as a search system 101 according to an embodiment. That is search system 101 is one example of an application of a tag reading system 1. The search system 101 is a system for searching for a specific RFID tag T within in a search area. For example, the specific RFID tag T may be attached to a specific item or commodity. When searching for a specific item or commodity in a warehouse or a store, the search system 101 estimates a position of an RFID tag based on a reading results of the RFID tag T obtained by the tag reader 110. The search system 101 displays the position of the specific item or commodity as estimated from the reading results of the RFID tag T. Thus, the search system 101 can support a search for a particular commodity, as specified by an operator, when the commodity has a known or identifiable RFID tag attached thereto.

The search system 101 shown in FIG. 2 includes a hand-held type tag reader 110 and a host device 111 communicably connected to the tag reader 110. In the example configuration shown in FIG. 2, the tag reader 110 is a modification of the tag reader 10 depicted in FIG. 1, and the host device 111 is a modification of the host device 11 depicted in FIG. 1.

The tag reader 110 includes, in addition to the configuration of the tag reader 10 shown in FIG. 1, a gripping part 121, for gripping by an operator, and a holding part 122, for holding the host device 111. An operator grips the gripping part 121 and operates the tag reader 110 with the host device 111 being held by the holding part 122. For example, until a desired RFID tag T is detected, the operator moves the tag reader 110 around to search a search area.

The host device 111 has the same or substantially the same configuration as that of the host device 11 shown in FIG. 1 but includes a display device 131 with a touch panel as the display device 15 and the input device 16. For example, the host device 111 may be implemented as a portable information terminal such as a smartphone or a tablet PC. The host device 111 notifies the operator of the position of the desired RFID tag T as estimated based on the reading results from the tag reader 110.

The search system 101 searches for the RFID tag T while the operator grips the tag reader 110 at the gripping part 121 and moves the tag reader 110 with the host device 111 communicably connected to the tag reader 110 while held by the holding part 122. In the search system 101, the tag reader 110 attempts to read RFID tags at a predetermined reading interval. Tag reader 110 can read RFID tags within the communication range R, the position of which can be changed by movement of the tag reader 110 by the operator. The tag reader 110 supplies the reading results for the RFID tags in the communication range R. The tag reader 110 supplies, to the host device 111, this acquired tag information (or tag ID), such as an Electronic Product Code (EPC), an RSSI value of the received signal providing the tag information, and the output value being used by the tag reader 110 in the reading attempt corresponding to the received signal as a reading result of each RFID tag in the communication range R.

The host device 111 detects the reading result of a desired RFID tag T from the reading results supplied from the tag reader 110 for all the RFID tags. The host device 111 estimates the position of the RFID tag T based on the reading results for the RFID tag T. For example, the host device 111 detects a change in the position of the RFID tag T or the relative position between the tag reader 110 and the RFID tag based on the minimum output value or the like included in the reading results of the RFID tag T. The host device 111 displays information indicating the position or the like of the RFID tag T as estimated based on the reading results on display device 131.

Figure 3:
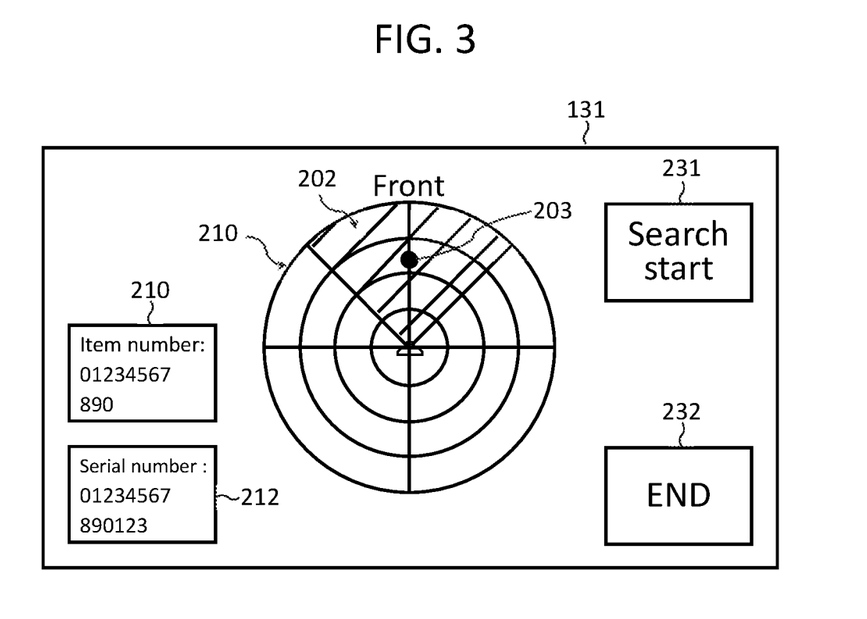
FIG. 3 depicts an example display of a host device in a tag reading system according to an embodiment.

FIG. 3 depicts an example display screen for a search result of an RFID tag as displayed by the host device 111 according to the present embodiment. In the search system 101, the host device 111 estimates a position of a specific RFID tag based on the reading results from the tag reader 110. The host device 111 detects the position of the specific RFID tag as a relative position with respect to the tag reader 110. The host device 111 displays information indicating the position of the specific RFID tag on the display device 131.

In the example display screen shown in FIG. 3, the display device 131 displays a read range symbol 202 corresponding to a reading range of the tag reader 110. The read range symbol 202 is superimposed on a concentric circle symbol 201, which is centered on the position of the tag reader 110. For example, the display device 131 displays the read range symbol 202 on the concentric circle symbol 201 such that its upper side coincides with the front side (that is the read direction) of the tag reader 110. Thus, the facing direction of the tag reader 110 and the display orientation direction can be intuitively recognized.

The display device 131 displays a mark 203 indicating a position of a RFID tag that has been read. The mark 203 is superimposed on the read range symbol 202 and the concentric circle symbol 201. For example, the host device 111 estimates the relative position of the RFID tag based on the RSSI value and the output value included in the reading results for the RFID tag received from the tag reader 110. The display device 131 shows an estimated distance from the tag reader 110 to the RFID tag by displaying the mark 203 on the concentric circle symbol 201. This enables the display device 131 to notify the operator of the distance from the tag reader 110 at which the RFID tag is present. The position of the RFID tag relative to the facing direction (present orientation) of tag reader 110 can also be indicated by placement of the mark 203 on the concentric circle symbol 201.

In the example display shown in FIG. 3, the display device 131 also displays, in display region 210, an item number being searched for and a serial number of the RFID tag, corresponding to the mark 203, in the display region 212. Thus, the operator can easily confirm the RFID tag as the search target. The display device 131 may also display a search start button 231 and an end button 232. The search start button 231 and the end button 232 are buttons that the operator can operate on a touch panel, which functions as an input device 16 in this context. The search start button 231 is a button for the operator to designate start of an RFID tag search. The end button 232 is a button for the operator to designate end of RFID tag search. The operator can search for an RFID tag by operating the tag reader 110 while viewing the screen as shown in FIG. 3.

Figure 4:
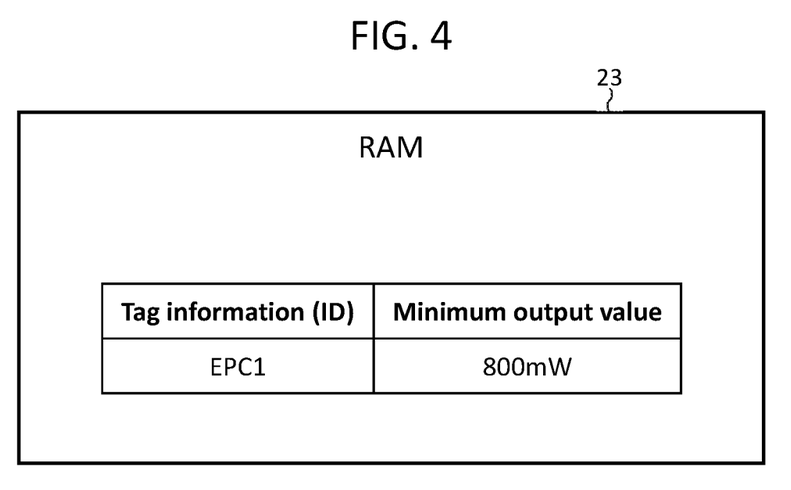
FIG. 4 depicts an example a reading result of an RFID tag according to an embodiment.

FIG. 4 depicts an example reading result of an RFID tag as read by the tag reader 10 and stored in the RAM 23 thereof (see FIG. 2) according to the present embodiment. The processor 21 stores the tag information (ID) of each read RFID tag along with the minimum output value at which the RFID tag could be read by the tag reader 10. This information is stored in the RAM 23 in association with each other as the reading result of each RFID tag. In the RAM 23, after the tag information and the minimum output value are stored, the stored minimum output value is updated whenever the output value is lowered and the same RFID tag is successfully read again.

The minimum output value is lowest output value (power level) for the interrogation signal output from the antenna 25 at which the RFID tag can be successfully read by the tag reader 10. This value generally correlates to distance of the RFID tag from the tag reader 10. The output value is set by the output setting unit 46 of the communication control circuit 24 (FIG. 2) in accordance with a command from the processor 21. Therefore, the processor 21 can repeatedly read a specific RFID tag while changing the output value of the output signal. For example, the processor 21 can identify the minimum output value by repeatedly executing the reading operation of a specific RFID tag while gradually decreasing the output value until the RFID tag can no longer be successfully read. A similar process can be performed by gradually increasing the output value until the RFID tag can be successfully read.

The tag information is output by the RFID tag in response to a response request (or a read command) from the tag reader 10. The tag information includes, for example, a header, a commodity code, and a serial number. The header is information indicating a format of the tag information and a range of the commodity code in the tag information.

The commodity code, such as an Electronic Commodity Code (EPC) data, specifies a commodity, an article, an item, or the like (hereinafter collectively referred to as a commodity). The commodity code is, for example, a Stock Keeping Unit (SKU) code, a Japanese Article Number (JAN) code, or a European Article Number (EAN) code.

The serial number individually identifies each commodity. For example, two commodities that are recognized as the same commodity in terms of classification by commodity code can be given different serial numbers. That is, the commodities to which the RFID tags are attached can be managed as individual commodities by the respective serial numbers in addition to or instead of the commodity classification (commodity code basis).

Figure 5:
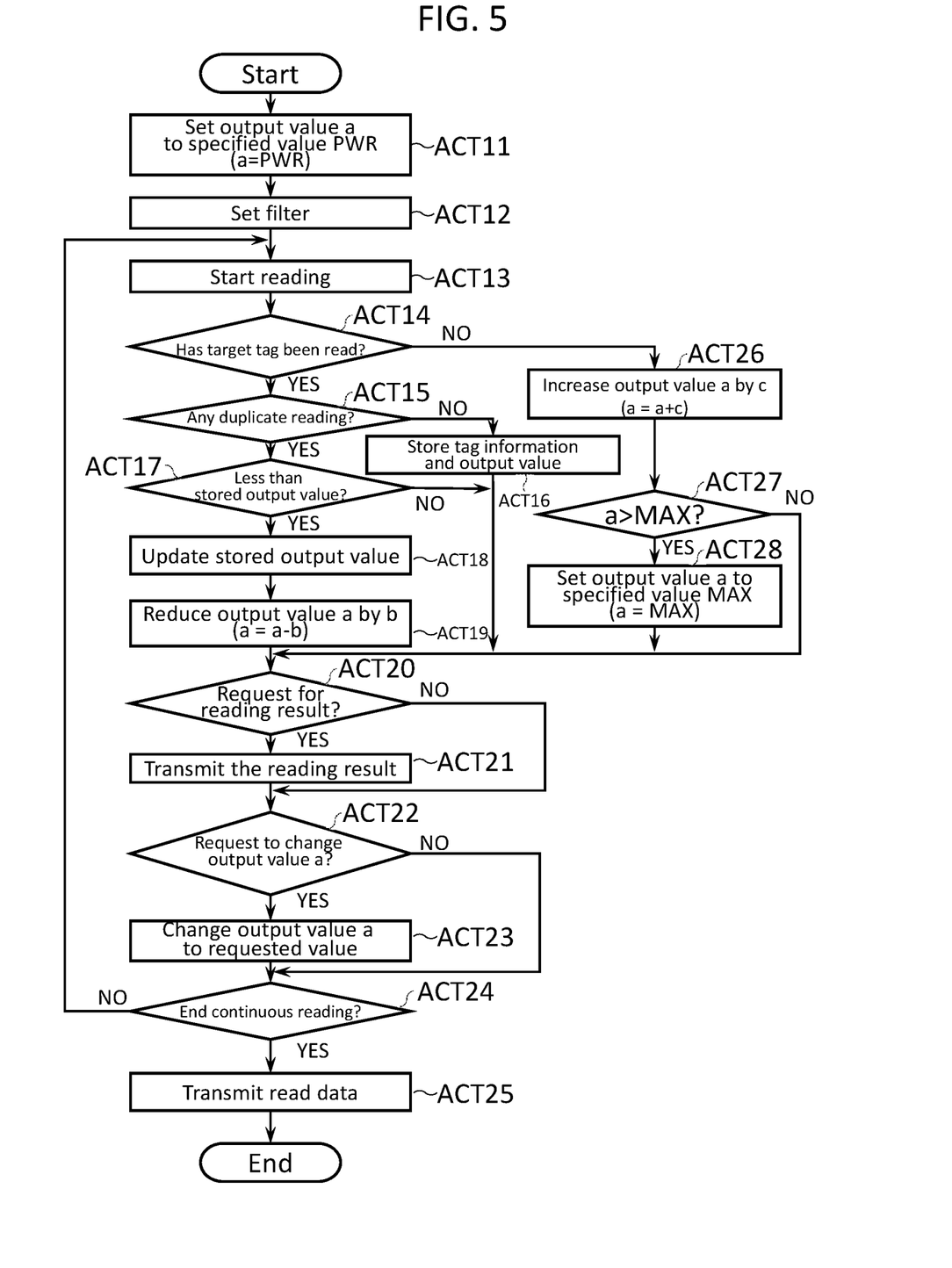
FIG. 5 is a flowchart of an example operation of a tag reader in a tag reading system according to an embodiment.

FIG. 5 is a flowchart of an example operation of the tag reader 10 according to the present embodiment. The processor 21 of the tag reader 10 starts continuous reading processing (such as the search processing) of an RFID tag in response to a command from the host device 11 connected through the communication I/F 26. In this example operation, the tag reader 10 acquires, from the host device 11, information indicating an RFID tag to be searched for (that is, a search target) and an initially specified output setting value for the output value of an output signal for a reading operation.

Upon start of the continuous reading processing, the processor 21 sets an output value "a" for an output signal for the reading operation to a value "PWR" as specified by the host device 11 for the initial output value setting (ACT11). For example, the processor 21 stores a value that indicates the output value a in a register. The processor 21 designates the output value a stored in the register to the output setting unit 46. Accordingly, the communication control circuit 24 performs control such that the output signal from the antenna 25 becomes the specified value PWR.

The processor 21 sets a filter based on the information that indicates the particular RFID tag(s) to be searched for (hereinafter referred to as a target RFID tag) as specified by the host device 11 (ACT12). The processor 21 executes a search for the target RFID tag by setting the filter parameters to exclude RFID tags that are not being searched for. For example, only a particular commodity code and/or serial number may be permitted to pass the filtering process.

Once the filter for specifying the target RFID tag has been set, the processor 21 starts reading the RFID tags using the set output value a (ACT13). The processor 21 then determines whether the target RFID tag has been read by the output signal of the output value a from the antenna 25 (ACT14). The processor 21 determines that the target RFID tag has been read if a response signal from the target RFID tag has been received by the antenna 25 in response to the output signal of the output value a.

When a response signal including the target tag information has been received, that is, when the target RFID tag has successfully been read (ACT14, YES), the processor 21 further determines whether the target RFID tag reading is a duplicate reading, that is, whether the same RFID tag has already been read before (ACT15). For example, when the same tag information is already stored in the RAM 23, the processor 21 determines that the just read tag information represent a duplicate reading. Otherwise, the processor 21 determines that the just read tag information is not a duplicate reading.

If the current reading is not a duplicate reading (ACT15, NO), the processor 21 stores the current output value a, which is the output value of the output signal used for the current reading of the target RFID tag, in RAM 23 in association with the tag information included in the response signal received from the target RFID tag (ACT16). Here, the processor 21 may store the output value a being held in the register in association with the tag information. After storing the tag information and the output value, the processor 21 proceeds to ACT20.

If the current reading is a duplicate reading (ACT15, YES), the processor 21 determines whether the current output value a is smaller than the output value corresponding to the previously stored tag information for the same RFID tag (ACT17). The current output value a is the output value of the output signal used to obtain the current reading of the RFID tag and is held in the register. The stored output value is the output value stored in the RAM 23 prior to the current reading, in association with the tag information of the same RFID tag. For example, the processor 21 finds the stored output value in the RAM 23 and determines whether the current output value a is less than the stored output value.

If the current output value a is greater than or equal to the stored output value (ACT17, NO), the processor 21 proceeds to ACT20 without updating the stored output value in RAM 23. The stored output value is thus the minimum output value at which the RFID tag has been be read, but can be updated as the output value used in the reading operation is changed and new tag reading results are acquired. However, if the current output value a is greater than or equal to the stored output value, it is not necessary to update the stored output value in the RAM.

If the current output value a is less than the stored output value (ACT17, YES), the processor 21 updates the stored output value with the current output value a (ACT18). For example, the processor 21 rewrites the stored output value held in the register to the current output value a.

After the stored output value in the RAM 23 is updated, the processor 21 decreases the output value a to be used for the next reading operation (ACT19). For example, the processor 21 reduces the output value a by an increment b set in advance. In this case, for example, the processor 21 sets the output value a held by the register to a−b (a=a−b). The increment b may be preset as appropriate. For example, the increment b is stored in the data memory 29. Thus, the processor 21 can set the increment b stored in the data memory 29. After decreasing the output value, the processor 21 proceeds to ACT20.

When the target RFID tag cannot be read in ACT14 (ACT14, NO), the processor 21 increases the output value a of the output signal used for the reading operation (ACT26). For example, the processor 21 increases the output value a by a preset increment c. That is, the processor 21 increases the output value a by an increment c by setting the output value a held in the register to a+c (a=a+c). The increment c may be set as appropriate. For example, the increment c is stored in the data memory 29. Thus, the processor 21 can set the increment c stored in the data memory 29.

The increment b and the increment c may be the same value or different values. Further, the increment b and the increment c need not be constant and may be varied according to various conditions. In a case where increment b and the increment c are variable according to different conditions, the processor 21 can change the output value a by an increment b or an increment c set according to the different conditions.

After increasing the output value a, the processor 21 determines whether the increased output value a exceeds a specified value MAX, which is a maximum output setting value (ACT27). If the increased output value a does not exceed the specified value MAX (ACT27, NO), the processor 21 keeps output value a as it is, and proceeds to ACT20. If the increased output value a exceeds the specified value MAX (ACT27, YES), the processor 21 updates the output value a to the specified value MAX (ACT28) and proceeds to ACT20. This way, the processor 21 can vary the output value a within a range not exceeding the specified value MAX provided by the host device 11 or the like.

In ACT20, the processor 21 determines whether to transmit the reading result of the RFID tag stored in RAM 23 to the host device 11 (ACT20). For example, the processor 21 determines to output the reading result stored in the RAM 23 in response to a reading result transmission request from the host device 11.

If there is a request for the reading result of the RFID tag from the host device 11 (ACT20, YES), the processor 21 transmits the reading result including the tag information stored in RAM 23 and the stored output value (which corresponds to presently determined minimum output value) to the host device 11 (ACT21). This way, the processor 21 can notify the host device 11 of the minimum output value together with the read tag information.

During the continuous reading processing, the processor 21 can receive an output setting command, that is a command to request the change or setting of the output value, from the host device 11 (ACT22). When the output value setting command is received (ACT22, YES), the processor 21 changes the output value a held in the register to an output setting value specified (requested) by the command (ACT23). For example, if the output setting command designates the specified value PWRa, the processor 21 rewrites the output value a held in the register to PWRa. Accordingly, each time the processor 21 receives an output setting command from the host device 11, the processor 21 changes the output value a to an output setting value specified by the command.

The processor 21 determines whether to end the continuous reading processing (the search processing in the present embodiment) (ACT24). For example, the processor 21 determines that the continuous reading processing is to be ended when a command requesting the end of the continuous reading processing is received from the host device 11.

In a case where the continuous reading processing is not to be ended, that is, where the reading operation is to be executed again (ACT24, NO), the processor 21 returns to ACT13. When the continuous reading processing is to be ended by the request from the host device 11 or otherwise (ACT24, YES), the processor 21 stops the continuous reading operation and transmits the data read from the RFID tag (ACT25).

In the continuous reading processing according to the present embodiment, the tag reader 10 identifies the minimum output value for the output signal at which the target RFID tag can be read and transmits this identified minimum output value to the host device 11. The tag reader 10 repeatedly executes a reading operation while gradually changing the output value of the output signal. When the tag reader 10 reads the target RFID tag, the tag reader 10 stores the output value of the output signal with which the current reading of the RFID tag has been obtained in memory, such as the RAM 23, in association with the tag information of the target RFID tag as read. In a case where there is a duplicate reading of the target RFID tag already stored in the memory, if the current output value is less than the previously stored output value, the tag reader 10 updates the stored output value to the current output value. The tag reader 10 updates the host device 11 of the minimum output value at which the specific RFID tag can read.

Thus, the tag reader 10 according to the present embodiment can specify the minimum output value from the result of reading the RFID tag by changing the output value without a command or a request to change the output value from the host device 11. In this case, the tag reader 10 can perform the process of specifying the minimum output value from the result of reading the RFID tag without waiting for a command from the host device 11 and can specify the minimum output value at high speed. In addition, the tag reader 10 can provide the host device 11 with information indicating the minimum output value at which the RFID tag can be read. Therefore, it is possible to reduce the processing load on the host device 11.

Figure 6:
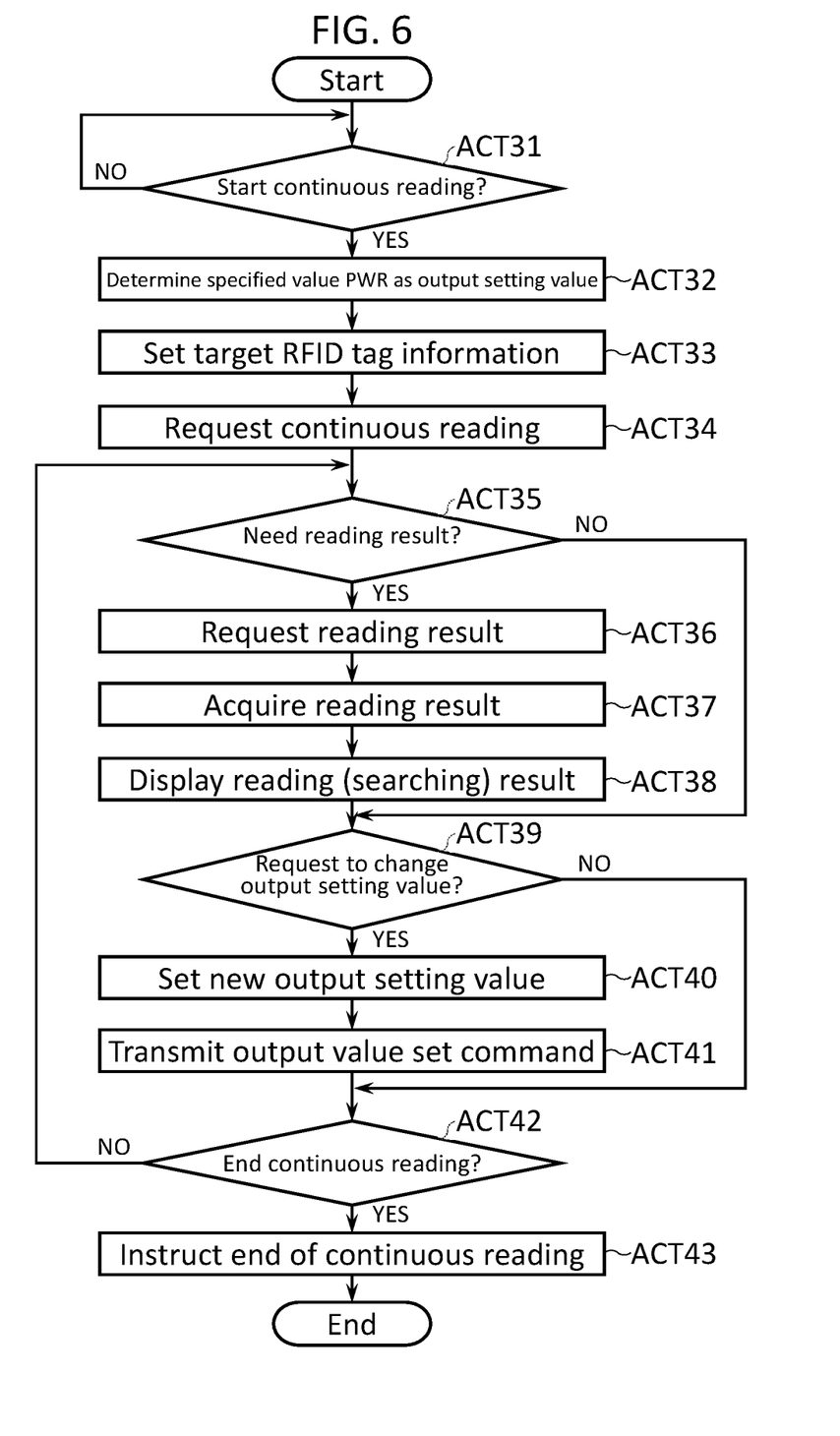
FIG. 6 is a flowchart of an example operation of a host device in a tag reading system according to an embodiment.

FIG. 6 is a flowchart of an example operation of the host device 11 according to the present embodiment. In a standby state, the processor 12 of the host device 11 waits for an instruction to start continuous reading processing (ACT31). For example, the processor 12 of the host device 11 starts the continuous reading processing in response to an instruction or a request from an operator. In one instance, when an operator presses or selects the search start button 231 shown on the display device 131 of the host device 111 (FIG. 3), the processor 12 starts the continuous reading processing to search for a target RFID tag.

When the continuous reading processing is started, the processor 12 determines a specified value PWR as an output setting value for an output value a to be used for the reading operation by the tag reader 10 (ACT32). In one instance, the specified value PWR can be based on a designated value from the operator. In another instance, the specified value PWR may be a default preset value.

The processor 12 sets the search information for the target RFID tag (search target) (ACT33). For example, when the operator wants to search for a particular commodity or commodity type, then a commodity code (such as an EPC) recorded in an RFID tag attached to the designated commodity or commodity type can be set by the processor 12 as a search criterion for the target RFID tag to be read.

Once the specified value PWR and the target RFID tag search criteria are set, the processor 12 requests the tag reader 10 to perform a continuous reading operation to search for the target RFID tag using the specified value PWR as an initial setting (ACT34). For example, the processor 12 transmits, to the tag reader 10, a continuous read command in which the specified value PWR for the output value a and information indicating the target RFID tag are designated.

After requesting the tag reader 10 to perform the continuous reading operation, if a reading result of the target RFID tag is needed (ACT35, YES), the processor 12 requests the tag reader 10 to transmit the reading result of the target RFID tag (ACT36). For example, the processor 12 requests the reading result by sending a command for requesting the reading result to the tag reader 10.

The processor 12 acquires the reading result of the target RFID tag transmitted from the tag reader 10 in response to the transmission request (ACT37). The reading result of the target RFID tag acquired from the tag reader 10 includes the presently determined minimum output value at which the target RFID tag has been read, together with the tag information of the target RFID tag. When the reading result is acquired from the tag reader 10, the processor 12 specifies information to be displayed as the reading result (search result) of the target RFID tag based on the acquired reading result and displays the information on the display device 15 (FIG. 2) or the display device 131 (FIG. 3). For example, when the information as shown in FIG. 3 is to be displayed on the display device 131, the processor 12 estimates the position of the read RFID tag with reference to the position of the tag reader 10 and displays the position on the display device 131.

The processor 12 can also request the tag reader 10 to change/update the output setting value during the continuous reading operation (ACT39). For example, the processor 12 determines whether to designate a new output setting value for the tag reader 10 in accordance with a designated value input by the operator of the host device 11, for example. In another instance, when the processor 12 acquires the reading result of the RFID tag, the processor 12 may request to adjust the output value a based on the acquired reading result values.

If the output setting value is designated (changed) by the host device 11 (ACT39, YES), the processor 12 sets the output setting value accordingly (ACT40). For example, the processor 12 can determine to change the present output value based on the minimum output value included in the reading result acquired from the tag reader 10. In one instance, the processor 12 may change the output setting value to the minimum output value or may set the output setting to value to a value calculated by reference to the previously received minimum output value.

Once the new output setting value for the tag reader 10 has been set or otherwise determined, the processor 12 generates an output value set command for designating the new output setting value as the output value and transmits the generated command to the tag reader 10 (ACT41). With this command, the new output setting value is set as the output value a in the tag reader 10.

Eventually, the processor 12 receives an instruction to end the continuous reading operation or otherwise determines to end the continuous reading operation (ACT42). For example, the processor 12 determines that the continuous reading operation is to be ended when the end button 232 shown on the display device 131 (FIG. 3) is pressed by the operator. When the continuous reading operation is to be ended (ACT42, YES), the processor 12 instructs the tag reader 10 to end the continuous reading operation (ACT43). For example, the processor 12 transmits, to the tag reader 10, an end command for instructing the end of the continuous reading operation. In response to the end command, the tag reader 10 ends the continuous reading of the RFID tag.

In the tag reading system 1 according to the present embodiment, the tag reader 10 identifies a minimum output value for an output signal capable of reading the target RFID tag and notifies the host device 11 of the minimum output value. The host device 11 acquires the minimum output value from the tag reader 10 and requests the tag reader 10 to output any setting corresponding to the minimum output value.

In the tag reading system 1 according to the present embodiment, the tag reader 10 changes the output value a of the output signal for reading the RFID tags. The change is gradual and can be started from an output setting value designated by the host device 11. The tag reader 10 identifies the minimum output value of the output signal capable of reading the RFID tag from the results of reading the RFID tag while changing the output value a gradually. The tag reader 10 then transmits the determined minimum output value to the host device 11 together with the tag information read from the RFID tag.

In the tag reading system 1 according to the present embodiment, even if the tag reader 10 does not receive an instruction to change the output value a from the host device 11, the tag reader 10 can identify the minimum output value at which the RFID tag can actually been read by changing the output value a. As a result, the tag reading system 1 can specify at high speed the minimum output value for reading the target RFID tag during a continuous reading process (search process). The tag reading system 1 can also increase the speed of the process by the host device 11. Furthermore, since the tag reader 10 can automatically identify the minimum output value at which the target RFID tag can be read, the processing program installed in the host device 11 can be simplified.

In the present embodiment, the program (or programs) to be executed by the processor 32 of the tag reader 10 or the processor 12 of the host device 11 can be stored in advance in a memory, such as the ROM 22 of the tag reader 10 or the memory 13 of the host device 11. In another embodiment, the program (or programs) to be executed by the processor 32 or processor 12 may be downloaded to the tag reader 10 or the host device 11 from a network or may be installed in the tag reader 10 or the hot device 11 from a storage medium. The storage medium may be any storage medium that can store the program and be read by the tag reader 10 or the host device 11. The functions obtained by such program installation or download in advance may be realized in cooperation with an operating system (OS) or the like in the tag reader 10 or the host device 11.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tag reader, comprising:
a communication controller configured to control an output level of an output signal to be output from an antenna for reading a wireless tag;
a communication interface configured to communicate with a host device, and
a processor configured to:
start a continuous tag reading process in response to a command received from the host device via the communication interface,
control the communication controller to adjust the output level of the output signal during the continuous tag reading process,
identify a minimum output level of the output signal at which the wireless tag can be read and transmit the identified minimum output level to the host device through the communication interface.

2. The tag reader according to claim 1, wherein the communication controller is further configured to incrementally change the output level of the output signal in the continuous tag reading process in repeated reading attempts of the wireless tag.

3. The tag reader according to claim 2, wherein the output level for the repeated attempts is increased from an initial value specified by the command received from the host device.

4. The tag reader according to claim 3, wherein the communication controller decreases the output value with a predetermined decrease width stored in a memory of the tag reader.

5. The tag reader according to claim 2, wherein the output level for the repeated attempts is decreased from an initial value specified by the command received from the host device.

6. The tag reader according to claim 2, wherein the increment of the incremental change is a fixed value.

7. The tag reader according to claim 1, wherein the processor controls the communication interface to transmit the identified minimum output level to the host device together with tag information read from the wireless tag in response to a request from the host device received via the communication interface.

8. A tag reader, comprising:
an antenna;
a communication control circuit connected to the antenna and configured to control an output level of an output signal output from the antenna for reading a wireless tag; and
a processor connected to the communication control circuit and configured to:
execute, in response to a command from a host device, a continuous tag reading process including a plurality of reading attempts of the wireless tag using different output levels;
determine a minimum output level for the output signal at which the wireless tag can be read in the plurality of reading attempts; and
transmit the determined minimum output value to the host device along with tag information read from the wireless tag.

9. The tag reader according to claim 8, wherein the output level is decreased in the plurality of reading attempts based on a predetermined decrement.

10. The tag reader according to claim 8, wherein the processor is further configured to:
determine whether an output level for a successful reading attempt is smaller than a previously stored output level of a successful reading attempt; and
update the stored output value with the smaller output value if the output value is smaller than the stored output value.

11. The tag reader according to claim 8, wherein output level is increased in the plurality of reading attempts based on the predetermined increment.

12. The tag reader according to claim 11, wherein the processor is further configured to determine whether the output level exceeds a specified value.

13. The tag reader according to claim 8, wherein the wireless tag is a radio frequency identification (RFID) tag.

14. A tag reading system, comprising:
a host device with a first communication interface and a first processor, the first processor being configured to control the first communication interface to transmit commands; and
a tag reader with a second communication interface configured to connect to the first communication interface of the host device, the tag reader further including:
   an antenna;
   a communication control circuit connected to the antenna and configured to control an output level of an output signal output from the antenna for reading a wireless tag; and
   a second processor connected to the communication control circuit and configured to:
      execute, in response to a command from the host device, a continuous reading process including a plurality of reading attempts of the wireless tag using different output levels;
      determine a minimum output level for the output signal at which the wireless tag can be read in the plurality of reading attempts; and
      control the second communication interface to transmit the determined minimum output value to the host device along with tag information read from the wireless tag.

15. The tag reading system according to claim 14, wherein the output level is decreased in the plurality of reading attempts based on a predetermined decrement.

16. The tag reading system according to claim 14, wherein the second processor is further configured to:
   determine whether an output level for a successful reading attempt is smaller than a previously stored output level of a successful reading attempt; and
   update the stored output value with the smaller output value if the output value is smaller than the stored output value.

17. The tag reading system according to claim 14, wherein output level is increased in the plurality of reading attempts based on the predetermined increment.

18. The tag reading system according to claim 14, wherein the wireless tag is a radio frequency identification (RFID) tag.

19. The tag reading system according to claim 14, wherein the host device includes a display screen and is configured to indicate an estimated position of the wireless tag on the display screen, the estimated position being calculated based on the determined minimum output level at which the wireless tag has been successfully read by the tag reader.

20. The tag reading system according to claim 14, wherein the tag reader further comprises:
   a grip part configured to be held by an operator; and
   a host holding part configured to hold the host device.

* * * * *